United States Patent [19]

Blazek

[11] 3,923,082
[45] Dec. 2, 1975

[54] PIPELINE CLOSURE AND METHOD
[75] Inventor: George A. Blazek, Hinsdale, Ill.
[73] Assignee: Advance Valve Installations Inc., Hinsdale, Ill.
[22] Filed: Sept. 12, 1973
[21] Appl. No.: 396,509

Related U.S. Application Data
[63] Continuation-in-part of Ser. No. 242,728, April 10, 1972, abandoned.

[52] U.S. Cl. .................................................. 138/89
[51] Int. Cl.² ........................................... F16L 55/10
[58] Field of Search ........ 138/89, 93; 251/170, 171, 251/172

[56] References Cited
UNITED STATES PATENTS
2,988,111  6/1961  VerNooy ............................ 138/89
3,321,176  5/1967  Bolling ............................... 251/172

Primary Examiner—James J. Gill
Assistant Examiner—Anthony V. Ciarlante
Attorney, Agent, or Firm—Morris Spector

[57] ABSTRACT

Apparatus for closing a branch of a high pressure pipeline while the line remains under pressure, or permitting tapping of such a pipeline for establishing a branch or extension thereof and plugging that branch all while the line remains continuously under pressure. A sealing gasket seals the space between the plug and the wall of the pipeline and the arrangement is such that the gasket has an initial position and a final sealing position to which it is moved by grease pressure, so that the gasket is not scarred during the positioning of the plug, and also the pressure on the two sides of the plug may be equalized during the positioning so that movement of the plug does not have to be against the full pressure of the pipeline.

15 Claims, 9 Drawing Figures

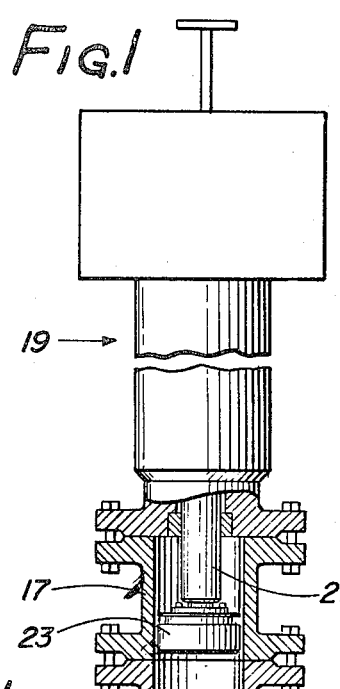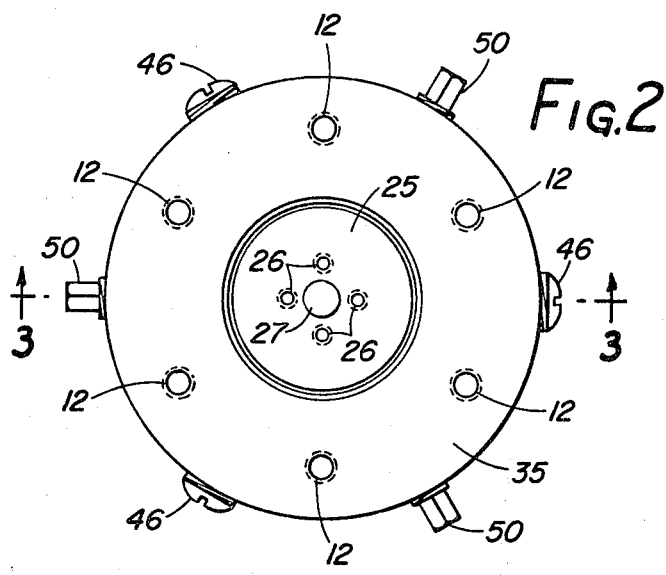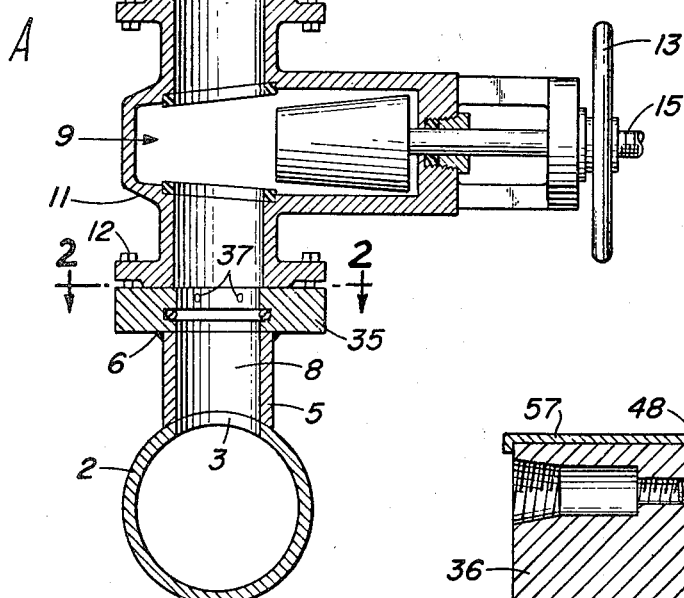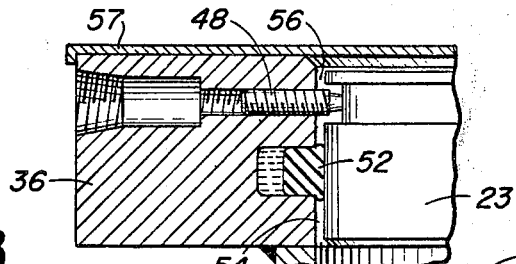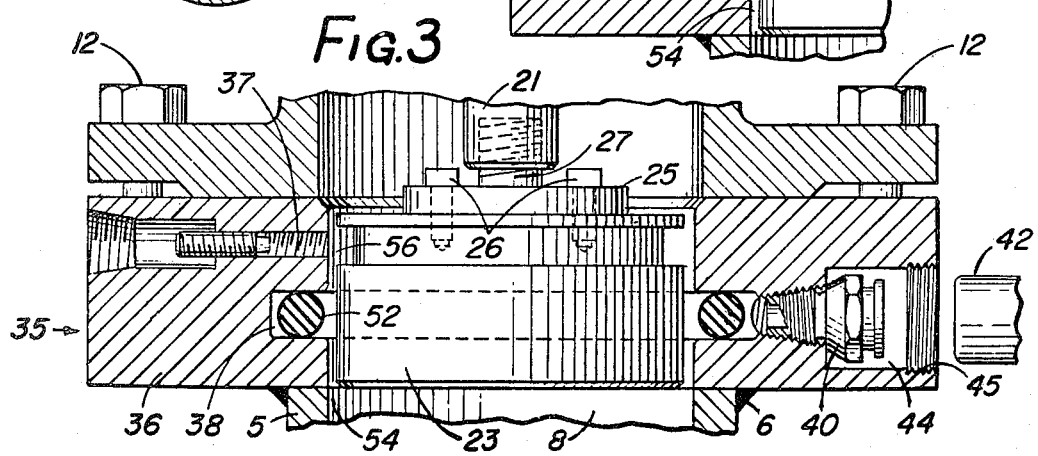

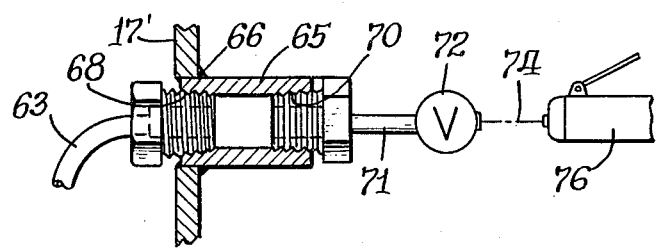
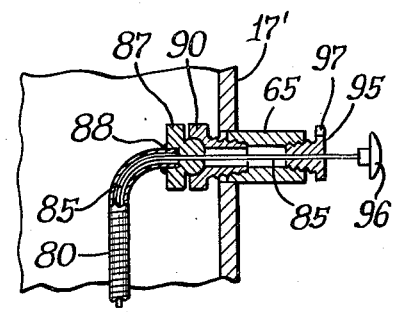
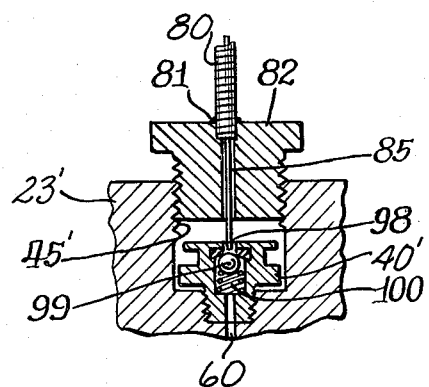
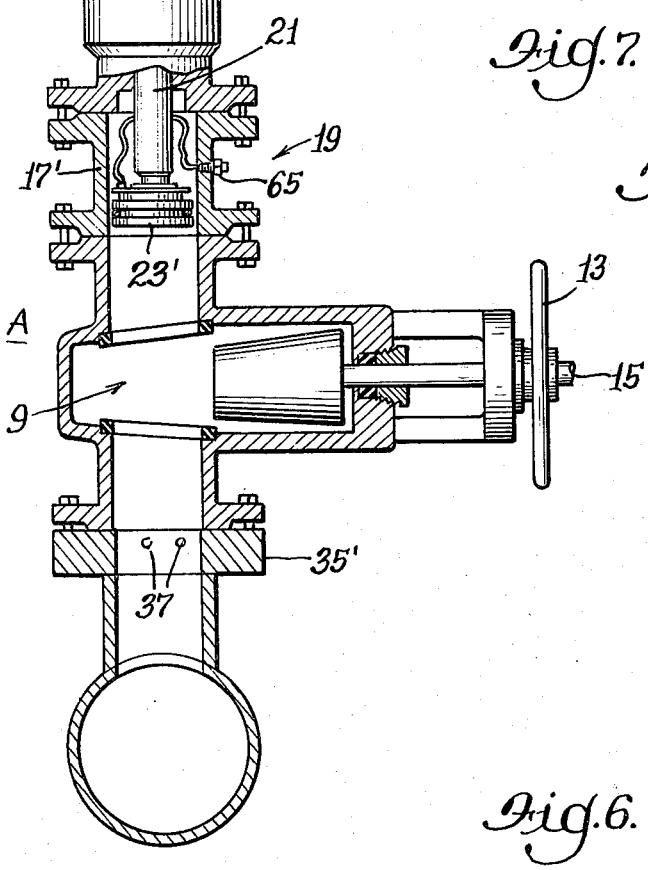
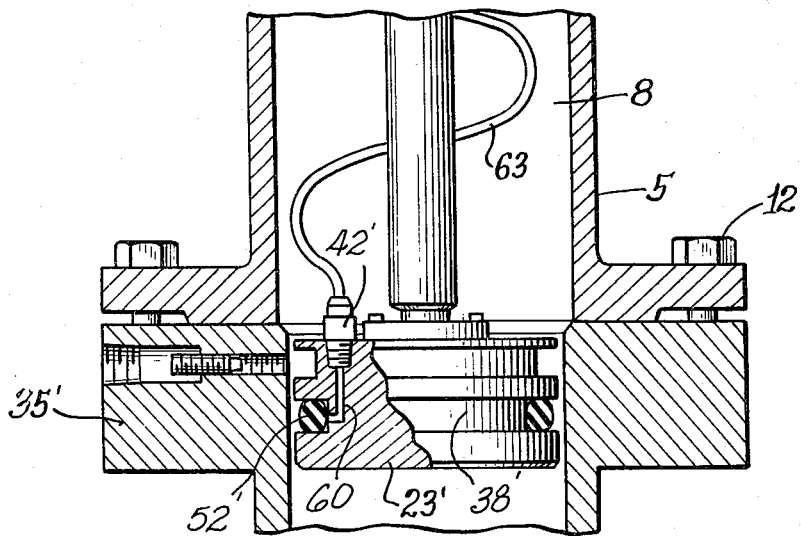

PIPELINE CLOSURE AND METHOD

OBJECTS OF THE INVENTION

This application is a continuation in part of my co-pending application, Ser. No. 242,728, filed Apr. 10, 1972 and now abandoned.

This invention relates to an improvement for opening or plugging a portion of a high pressure pipeline while the line is under pressure. The need for such arrangement is described in U.S. Pat. No. 2,771,096.

In a closure plug of the above type, a sealing gasket is relied upon to maintain a fluid tight seal between the plug and the pipeline. The pressure on the gasket must be very great to maintain a seal if the pipeline pressure is very great. It is an object of this invention to provide a gasketing arrangement which, during the process of moving the plug into position in the pipeline, provides clearance space for equalization of pressure on the two sides of the plug.

Another object of this invention is to provide a gasketing arrangement for systems of the above type wherein there is no high pressure sliding movement of the sealing gasket against the wall of the pipe into which it is being inserted, which may be rough and would injure the gasket. A still further object of this invention is to provide an arrangement wherein the gasketing means is ultimately effective to make a proper seal notwithstanding wide variations in eccentricity of the plug within the pipeline.

It is the further object of this invention to provide a closure plug of the above type which is so located that it can be removed from the pipeline for gasket replacement while the pipeline itself remains under pressure, by the use of the same equipment that is used to insert the closure plug in the first place.

The attainment of the above and further objects of this invention will be apparent from the following specification taken in conjunction with the accompanying drawings.

THE DRAWINGS

FIG. 1 is an elevational view, partly in section, of a pipeline with a hole bored therein and a boring machine mounted on the line for insertion of a plug in proper position;

FIG. 2 is a plan view of the pressurized stop plug assembly taken on the line 2-2 of FIG. 1;

FIG. 3 is a section taken along the line 3—3 of FIG. 2 showing the plug in place but before it has been locked in position;

FIG. 4 is a fragmentary section corresponding to a part of FIG. 3, with the plug in final position and sealed;

FIG. 5 shows a modification of a portion of FIG. 1 for installing a modified closure plug;

FIG. 6 is a figure corresponding to FIG. 3, showing the modified closure plug of FIG. 5 in place; and FIG. 7 is an enlargement of a fragmentary portion of FIG. 5;

FIG. 8 is an enlargement of a portion of FIG. 6 showing the connection thereto of a flexible shaft for releasing the check valve on the stop plug preparatory to removal of the plug.

FIG. 9 illustrates the connection of the upper end of flexible shaft 57 to the pass-through apparatus.

DESCRIPTION

Reference may now be had more particularly to the drawings wherein like reference numerals designate like parts throughout.

In FIG. 1 there is shown a pipeline 2 that transports high pressure fluid, such as, for instance, water, oil, chemicals, gases, etc. It has a hole 3 through a wall thereof, which hole is surrounded by a pipe nipple 5 that is welded to the pipeline and has a ring shaped pipeline section 35 welded to its opposite end by a circumferentially extending sealing weld 6. This forms, with the pipeline, a pressure chamber 8 that may be closed off at the section 35 from a pass-through apparatus A that includes a second pressure chamber 9 formed by a pass-through block valve 11 that is secured by bolts 12 to the ring section 35. The pass-through apparatus A also includes a pipe nipple or adapter 17 mounted on the top of the valve 11 and to which the lower end of a boring machine 19 is bolted. The valve 11 is operated between its closed and open positions by a hand-wheel 13 that advances or retracts a valve stem 15 to open or close the valve. The boring machine 19 has a boring rod 21 that is operated in a manner well known in the art and as described in the above mentioned patent, which is incorporated herein by reference. A plug 23, that has a removable mounting plate 25 bolted thereto by four bolts 26 has means, such as an upstanding shank 27, for releasably securing the plug to the bottom of the boring rod 21.

The construction of the pipe section 35 and its cooperation with the plug 23 will now be described, to which reference may be had to FIGS. 2, 3, and 4.

The pipe ring section 35 comprises a closure ring 36, which has an annular channel or groove 38 on its inner periphery. One or more grease pressure nipples 40, in this instance three spaced 120° apart, establish communication to the channel 38. Each nipple is of a standard construction adapted to receive the nozzle 42 of a grease gun whereby grease under pressure may be injected therethrough into the channel, and is provided with a check valve to retain the grease under pressure in the channel when the pressure nozzle is removed. Each grease gun nipple terminates in a circular hole 44 that is internally threaded as indicated at 45, so that it may be protected by a closure screw cap 46 threaded thereinto. The ring 35 also has three threaded bores 37, also spaced 120° apart, each of which receives a threaded locking screw 48. A threaded closure nut 50 closes the access opening to the screw 48. An O-type gasket ring 52 in the channel 38 makes a sealing fit with the walls of the channel. It is normally of an internal diameter equal to or greater than the internal diameter of the ring 36.

The closure plug 23 is circular and of a diameter less than the inside diameter of the closure ring 36 to leave sufficient clearance space 54 through which fluid can pass from one side of the plug to the other as the plug is being lowered into position, thereby maintaining equality of pressure on the two sides of the plug, and to leave a reasonable tolerance for out of roundness of the parts. The plug also has a peripherally extending annular channel or groove 56. When the plug has been lowered to its ultimate position the channel 56 is opposite the holes 37 in the ring so that the locking screws 48 may then be turned to enter the channel 56 to lock the plug in position illustrated in FIG. 4. When the plug has been locked in position against axial movement, a grease gun is applied to any one of the nipples 40, or may be applied to all three of them successively, for injecting grease under high pressure into the channel 38 of the closure ring. The O-ring maintains a seal with the side walls of the channel 39. As the pressure is being applied, the O-ring is forced gradually inwardly until it engages the periphery of the plug 23. Further pressure produced by additional grease distorts the O-ring into firm sealing engagement with the periphery of the plug. This is true whether the plug is concentric with the ring 36 or eccentric thereof within limits, as may be the case if the three locking screws 48 have not all been turned into the bores 37 of the ring by the same amounts. At the same time the O-ring maintains a fluid tight seal with sides of the channel 38 of the ring 36, thus sealing off the top surface of the plug 23 from the bottom surface. Thereafter the boring machine 19 and the valve 11 may be removed from the ring 36, then the plate 25 removed, and the top of the ring closed by a blind cap 57 that fits over the closure ring 36.

At a future time, if it is desired to extend the conduit 8, it is merely necessary to remove the blind cap, replace the mounting plate 25, the block valve 24 and the machine 19, then release the grease pressure in the channel 39 and release the locking screws 37, whereupon the boring stem 21 may be manipulated to withdraw the plug 23 from the ring 36 to a position corresponding to that shown in FIG. 1 of the drawing. The valve 11 may then be closed and the machine 19 removed. Thereafter extensions from the line 2 may be made at the top of the valve 11, similar to the connection of the reducing nipple 17.

The O-ring 52 is made of any suitable gasketing material, such as, for instance, rubber, neoprene compounds, ethelene-propolene compounds, or other sealing material. During the movement of the plug 23 into position there is no scraping of the O-ring gasket and therefore the O-ring gasket is not then subject to destructive cutting or other marring action. Also, during the movement of the plug the pipeline pressure is equalized on both sides of the plug by reason of the clearance 54 between the plug 23 and the ring 36 so that the resulting advantages of equalization of pressure on opposite sides of the plug as described in U.S. Pat. No. 2,771,096 are obtained without the expense of costly valve structures or possible injury to gasket, as in the prior art.

Reference may now be had more particularly to FIGS. 5 and 6 showing a modified construction. Insofar as the structures are the same in FIGS. 1 and 3, the same reference numerals have been used. To the extent that the structures are different, but analogous, corresponding figures with a prime added have been used. In this embodiment, the ring section 35' differs from the previous ring section in that it omits the annular channel 38, the associated pressure nipples 40 and the circular bores 44 of FIG. 3. The plug 23' had an annular channel 38' formed therein that is closed by an O-ring 52', the ring being seated within the channel 38' as shown in FIG. 6 so that it can later be forced into sealing position against the internal surface of the pipeline section 35'. A grease fitting 40 threads into a bore in the top surface of the plug 23', which bore communicates with a port 60 that communicates with the channel 38', as illustrated in FIG. 6. The grease fitting 40 is a spring closed closing ball check fitting. When grease pressure is applied thereto, from the end that is outside of the plug 23', that grease pressure unseats the ball check and permits grease to flow via the port 60 into the channel 38' to force the O-ring 52' radially outwardly into an engagement with the inner periphery of the ring 35' and to make a seal between the plug and the inner peripheral surface of the ring 35'. When the applied grease pressure is removed, the ball check closes and prevents the escape of pressure from the chamber formed in the channel 38' that is closed by the O-ring 52'. To pressurize chamber 26 of the plug 23', there is provided a nozzle 42', of the type used on grease guns, which nozzle 42' terminates in a flexible tube 63. In this instance the opposite end of the tube terminates in a coupling 65 that is welded to the adapter 17' as indicated at 66. The coupling 65 is internally threaded as indicated at 68 to receive a proper fitting at the end of the flexible tube 63 or other apparatus that may be similarly connected thereto as will be further explained. At its opposite end, the coupling 67 is threaded as indicated at 70 to receive a pipe connection 71, leading to a manually operable valve 72 that may be releasably connected to the outlet 74 of a manually operable pressure grease gun 76 so that when the valve is shut, the tubing 63 is closed at the corresponding end thereof, and when the valve 72 is open, it communicates with the grease gun 76 for transmitting grease under pressure to the tubing 63 and thence to the ball check valve 40 to expand the O-ring into sealing engagement with the circular inner wall of the ring 35'.

The apparatus thus far described may also be used to facilitate removal of the closure plug. To do this, there is provided a flexible shaft 80, the outer wall of which is welded or otherwise sealed at 81 to a nut 82 that threads into threads 45' in the plug 23' similar to the threads 45 of the ring section 35 previously described. The flexible shaft 80 includes a flexible plunger 85 that is slidably thru a well known manner. The outer wall of the flexible shaft 80 has at its opposite end a connector 87 sealed thereto as at 88 and terminating in a swivel connection connector 90 that is adapted to be threaded into the coupling 65 previously described. The flexible shaft 85 extends thru the coupling 65, being guided by a nut 95 and terminates in a knob 96. The nut 95 has the usual finger grip portion 97 so that the knob 96 can be pushed inwardly. The inner end of the flexible shaft 85 is thus forced lengthwise through the tubing 80 until the tapered end 98 engages and unseats the ball 99 of the check valve 40 against the action of the biasing spring 100, thus permiting the release of the grease pressure against the O-ring so that some of the grease escapes and thus releases the grip of the sealing gasket O-ring against the wall of the ring 35'. This permits withdrawal of the plug 23' thru the pass-through device A.

What is claimed is:

1. Apparatus for forming a fluid-tight closure within a pressure conduit while it is under pressure, said apparatus comprising a conduit section member having a fluid-flow passageway therethrough, a closure plug member slidable in the section member in a direction lengthwise of the passageway into a position for later closing the section, said closure member being of the same peripheral shape as, but smaller than, the peripheral shape of the passageway, characterized by the fact that there is an annular channel formed at the interface of one of said members with the open end of the channel facing radially of the passageway towards the other member, and sealing gasketing means in the channel, said gasketing means having (a) an intermediate position that it occupies during the positioning of the plug into the conduit section, and (b) a final pressure sealing position; said gasket means being movable from the intermediate position towards the open face of the channel to its final position and means for making connection to a source of pressure for pressurizing the channel to force the gasketing means into said final position, said last means including a check valve for retaining the pressure in the channel when said last means is disconnected from said source of pressure.

2. The combination of claim 1 wherein there is provided means for locking the plug against axial movement in the conduit section.

3. The combination of claim 1 wherein the channel is in the conduit section.

4. The combination of claim 1 wherein the channel is in the plug member.

5. The combination of claim 4 wherein there is provided a flexible tube connected to the check valve for supplying fluid under pressure to the channel via the check valve.

6. The combination of claim 5 wherein there is a pass-through device including a pressure chamber having a fluid flow passageway connected with said first fluid flow passageway, the second chamber including a pass-through valve, through which the closure plug is movable from the second chamber, and said flexible tube extending through said pass-through valve.

7. A fluid tight closure for a fluid flow passageway in a connecting conduit between pressure vessels, said closure comprising a body movable to its desired position within the conduit, fluid pressure operated seal gasket means for establishing a seal between the body and the conduit after the body is in position, said seal means being operable from a non-sealing relation between the body and conduit to permit fluid through the interspace between the body and the conduit as the body is being moved into its position in the conduit to a sealing relationship, and means for establishing a connection to a source of fluid pressure for operating the seal means to seal the space between the body and the conduit after the body is in position, said last means including a check valve for retaining the fluid pressure after the connection with said source of pressure has been interrupted.

8. The combination of claim 7 wherein the check valve has an inlet side accessible inside one of said vessels, a fluid pressure conveying tube connected at one end of said inlet side of the check valve, and said tube extending a passageway to and thru the wall of said one of the vessels for a flow of pressurizing fluid to and through the check valve.

9. The combination of claim 8 wherein the gasket is in a channel in the closure and makes a sealing fit with the side walls of the channel and is movable towards the open side of the channel by fluid under pressure forced into the channel through said check valve.

10. A fluid tight closure for a connecting conduit between pressure vessels wherein the connecting conduit has a fluid flow passageway therethrough, said closure comprising a body carrying a sealing gasket and movable to its desired position within the conduit, means for locking the body in its position, said sealing gasket being in non-sealing relation between the body and the conduit to permit fluid flow through the interspace between the body and conduit as the body is being moved into its position in the conduit, and means for establishing a connection to a source of fluid pressure for operating the seal means after the body is in position, to seal said interspace, said last means including a means for retaining the fluid pressure after disconnection of said source of pressure.

11. A high pressure fluid conduit section member having a fluid-flow passageway therethrough, a closure plug member slidable lengthwise in the passageway into a position for later closing the section, said closure member being of the same peripheral shape as, but smaller than, the peripheral shape of the passageway, characterized by the fact that there is sealing gasketing means for establishing a fluid tight seal between the plug and the conduit section members, said gasketing means having (a) an intermediate position that it occupies during the positioning of the plug into the conduit section, and (b) a final pressure sealing position; said gasket means being movable from the intermediate position towards its final position, and means for making connection to a source of pressure to force the gasketing means into said final position, said last means including a one way check valve for retaining the pressure when said last means is disconnected from said source of pressure.

12. A high pressure pipeline section having a closure plug having an annular gasket receiving channel, a gasket in the channel, means for connecting a pressurizing line to the channel for pressurizing the channel to move the gasket into pressure sealing engagement with the pipeline section and means for maintaining said sealing pressure after removal of the pressurizing line, in combination with apparatus for removing the plug with its gasket from the pipeline, and replacing the plug while the line is under pressure, to permit replacement of the gasket, said apparatus including a pass-through valve of a size sufficient to permit passage of the plug therethrough, and a pressure conveying tube extending through said apparatus and the valve portion thereof for connection to said plug to permit pressurizing the channel after the plug is reinserted into the pipe section.

13. The combination of claim 12 wherein the means for maintaining said sealing pressure after removal of the pressurizing line includes a check valve in the closure plug.

14. Pass-through apparatus for passing an accessory into a high pressure pipeline while the pipeline is under pressure, said apparatus including a pass-through valve, first means for connecting one end of the valve in communiation with the interior of a pipeline second means forming an accessory receiving sealed chamber with the other end of the valve, said valve forming a thru passageway for said accessory between said two means, a flexible pressure fluid transmitting tube forming a passageway thru the wall of said second means for transmitting an actuating fluid under pressure thru said tube to the accessory, said tube being of greater length than required to extend from the wall of said second means to said accessory so that there is slack in the tube at least sufficient to permit movement of the accessory from said second means through the valve and into and through said pass-through apparatus in combination with an accessory that includes gasketing means for making a sealing fit between the accessory and the pipeline, the gasketing means having (a) an intermediate position that it occupies during movement into location in the pipeline and (b) a final pressure sealing position to which it is moved by fluid pressure; said tube being connected to said accessary in said pass-through apparatus for transmitting fluid under pressure to move the gasketing means to its final position, and meeans for holding the pressure that was transmitted to the accessory, thereby permitting maintenance of said pressure even after separation of the pass-through apparatus from the accessory.

15. The combination of claim 14 wherein there is a check valve in the connection between the tube and the accessory for retaining pressure of the fluid on the gasketing means when the pressure applying means has been removed.

* * * * *